United States Patent
Ben-David

(10) Patent No.: US 10,880,084 B2
(45) Date of Patent: Dec. 29, 2020

(54) UTILIZATION OF SIM-MOBILE EQUIPMENT COMMUNICATION CHANNEL FOR HANDSET APPLICATIONS STATE MONITORING

(71) Applicant: Unibeam Ltd., Hod-HaSharon (IL)

(72) Inventor: Ran Ben-David, Hod-HaSharon (IL)

(73) Assignee: Unibeam Ltd., Hod-HaSharon (IL)

( * ) Notice: Subject to any disclaimer, the term of this patent is extended or adjusted under 35 U.S.C. 154(b) by 179 days.

(21) Appl. No.: 16/300,961

(22) PCT Filed: Jun. 8, 2017

(86) PCT No.: PCT/IL2017/050646
§ 371 (c)(1),
(2) Date: Nov. 13, 2018

(87) PCT Pub. No.: WO2017/212495
PCT Pub. Date: Dec. 14, 2017

(65) Prior Publication Data
US 2020/0280441 A1    Sep. 3, 2020

Related U.S. Application Data

(60) Provisional application No. 62/347,222, filed on Jun. 8, 2016.

(51) Int. Cl.
*H04L 9/08*    (2006.01)
*H04L 9/30*    (2006.01)

(52) U.S. Cl.
CPC .......... *H04L 9/0897* (2013.01); *H04L 9/3073* (2013.01)

(58) Field of Classification Search
CPC ........................... H04L 9/0897; H04L 9/3073
See application file for complete search history.

(56) References Cited

U.S. PATENT DOCUMENTS

| | | | |
|---|---|---|---|
| 7,266,371 B1 | 9/2007 | Amin et al. |
| 8,095,132 B2 | 1/2012 | Cheng et al. |
| 9,204,300 B2 | 12/2015 | Park et al. |
| 9,313,643 B1 | 4/2016 | Ghoshal et al. |
| 2007/0042754 A1 | 2/2007 | Bajikar et al. |
| 2008/0242267 A1 | 10/2008 | Soni et al. |
| 2012/0208597 A1 | 8/2012 | Billman |
| 2014/0057615 A1 | 2/2014 | Berry et al. |
| 2014/0087790 A1 | 3/2014 | Babbage et al. |

(Continued)

FOREIGN PATENT DOCUMENTS

| EP | 2693783 | 2/2014 |
|---|---|---|
| WO | WO 2017/212495 | 12/2017 |

OTHER PUBLICATIONS

International Preliminary Report on Patentability dated Dec. 20, 2018 From the International Bureau of WIPO Re. Application No. PCT/IL2017/050646. (6 Pages).

(Continued)

*Primary Examiner* — Marisol Figueroa

(57) ABSTRACT

An integrated circuit designed to be inserted into a port of a cellular communication device comprising a storage unit for storing an applet, wherein the applet comprises instructions for downloading to the UE device an application from an application server, obtaining a validation key shared with the application server, validating the application using the validation key, and sending to a cellular network service provider a request to unlock a locked use of the integrated circuit.

11 Claims, 4 Drawing Sheets

(56) References Cited

U.S. PATENT DOCUMENTS

| | | |
|---|---|---|
| 2014/0243045 A1 | 8/2014 | Siquenique |
| 2015/0201324 A1 | 7/2015 | Hauck et al. |
| 2015/0350456 A1 | 12/2015 | Chan |
| 2016/0080931 A1 | 3/2016 | Marsden et al. |
| 2016/0100309 A1 | 4/2016 | Velusamy |

OTHER PUBLICATIONS

International Search Report and the Written Opinion dated Sep. 11, 2017 From the International Searching Authority Re. Application No. PCT/IL2017/050646. (13 Pages).

UTILIZATION OF SIM-MOBILE EQUIPMENT COMMUNICATION CHANNEL FOR HANDSET APPLICATIONS STATE MONITORING

RELATED APPLICATIONS

This application is a National Phase of PCT Patent Application No. PCT/IL2017/050646 having International filing date of Jun. 8, 2017, which claims the benefit of priority under 35 USC § 119(e) of U.S. Provisional Patent Application No. 62/347,222 filed on Jun. 8, 2016. The contents of the above applications are all incorporated by reference as if fully set forth herein in their entirety.

BACKGROUND

When a mobile phone is purchased from a mobile services provider, it is sometimes provided with a Subscriber Identity Module (SIM) card that was configured by the mobile services provider. However, many users of mobile devices purchase the mobile phone device separately from the SIM card, or purchase the SIM card from other provider than the mobile services provider. In such cases, the SIM card may not be configured according to the requirements and/or preferences of the mobile service provider. For example, the security level of the SIM card may not suffice, or customized applications of the mobile services provider may not be included.

SUMMARY

According to an aspect of some embodiments of the present invention there is provided an integrated circuit designed to be inserted into a port of a cellular communication device including a storage unit for storing an applet. The applet includes instructions for downloading to the UE device an application from an application server, obtaining a validation key shared with the application server, validating the application using the validation key, and sending to a cellular network service provider a request to unlock a locked use of the integrated circuit.

In some embodiments of the present invention, the applet further includes instructions for presenting a message to a user about a requirement to download the application.

In some embodiments of the present invention, the applet further includes instructions for obtaining a pair of private and public encryption keys.

In some embodiments of the present invention, the applet further includes instructions for receiving from the application a validation request together with a first random key and an application instance identification. The applet may further include instructions for encrypting the first random key by a private encryption key, the private key is from a pair of private and public encryption keys, generating a second random key, sending the encrypted first random key, the second random key and the application instance identification to the application server, receiving the second random key from the application, and replying to the application with the public encryption key, wherein the public encryption key enables the application to decrypt the encrypted first random key, identify the first random key and unlock the application based on the identification.

In some embodiments of the present invention, the locked use of the integrated circuit includes disabled networking services, wherein unlocking of the use enables the networking services. In some embodiments of the present invention, unlocking of the use requires the validation of the application.

In some embodiments of the present invention, the use may be re-locked when a determined condition is fulfilled. The condition may include, for example, a pre-determined period of time, exiting of a certain geographical area, leaving of a coverage area of a network and/or change in a configuration of the device. The applet may further include instructions for displaying a notification when the use is re-locked. The applet may further include instructions for displaying a notification when the condition is about to be fulfilled. The applet may further include instructions for re-validating the application in order to unlock the use of the integrated circuit.

Further, according to an aspect of some embodiments of the present invention there is provided a method for securing a smart card, the method including obtaining by an applet stored on a smart card installed in a User Equipment (UE) device, a validation key shared with an application server for validating an application downloaded to the UE device, validating the application by the applet, using the validation key, and sending to a smart card controller a request to unlock use of the smart card.

Further, according to an aspect of some embodiments of the present invention there is provided a computer program product comprising a computer readable storage medium having computer readable program instructions thereon for causing a processor to obtain a validation key shared with an application server for validating an application downloaded to the a User Equipment (UE) device, validate the application by using the validation key, and send to a smart card controller a request to unlock use of a smart card installed on the UE device.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
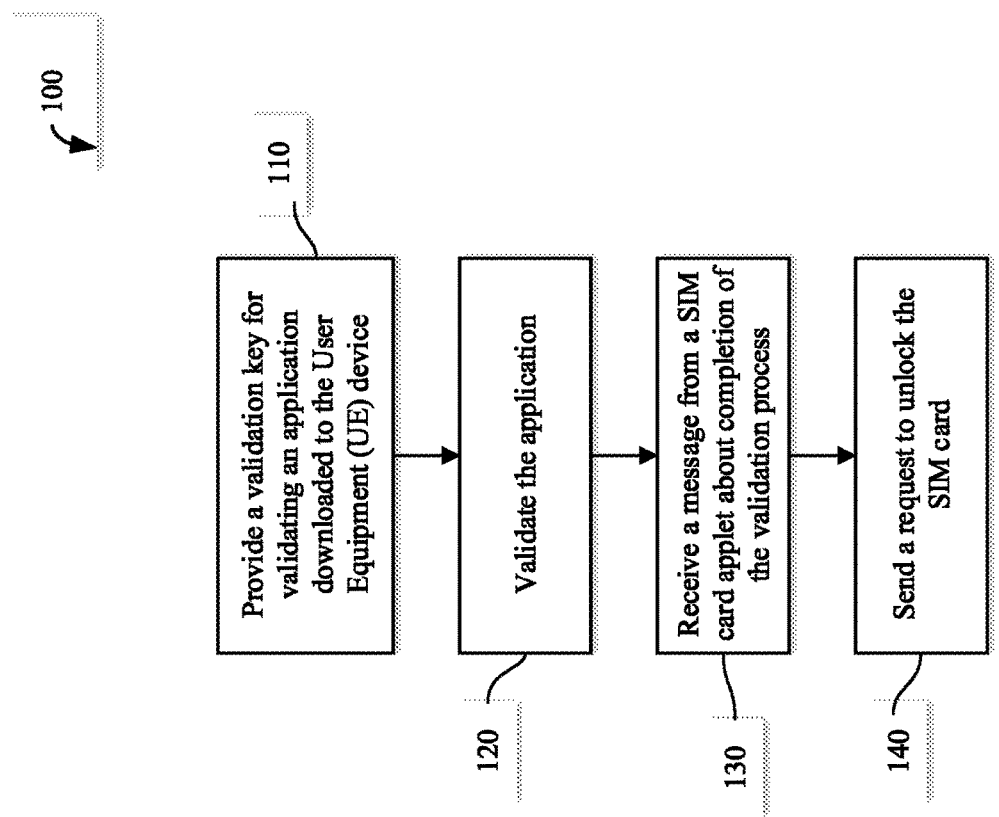
FIG. 1 is a schematic flowchart illustrating a method for securing a Subscriber Identity Module (SIM) card.

According to some embodiments of the present invention, a system and method is provided for securing a SIM card and for enabling a mobile services provider customization of the SIM card and/or the mobile device in which the SIM card is installed.

A system provided by some embodiments of the present invention may include a customize SIM card that includes a special applet and an application server controlling an application that controls the access to the mobile device, herein referred to as an access application. The access application is downloaded to the device, and must go through a pairing process with the SIM card applet in order to enable full utilization of the mobile device.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, which is a schematic flowchart illustrating a method 100 for controlling and securing a smart card or an integrated circuit card designed to be inserted into a port of a cellular communication device, such as, for example, a Subscriber Identity Module (SIM) card or a Universal Integrated Circuit Card (UICC). In some embodiments of the present invention, an application server is used for download, storage and execution of an application for securing access to a SIM card, herein referred to as an access application. Additionally, the SIM card according to some embodiments of the present invention may include an applet for securing the SIM card, for example in conjunction with the access application.

The method according to embodiments of the present invention may enable controlling access to the smart card and/or the mobile device in which the smart card is installed, and thus, for example, enforcing customization of the smart card and/or the mobile device in which the smart card is installed, for example, according to requirements of the mobile services provider or any other suitable entity.

Figure 2:
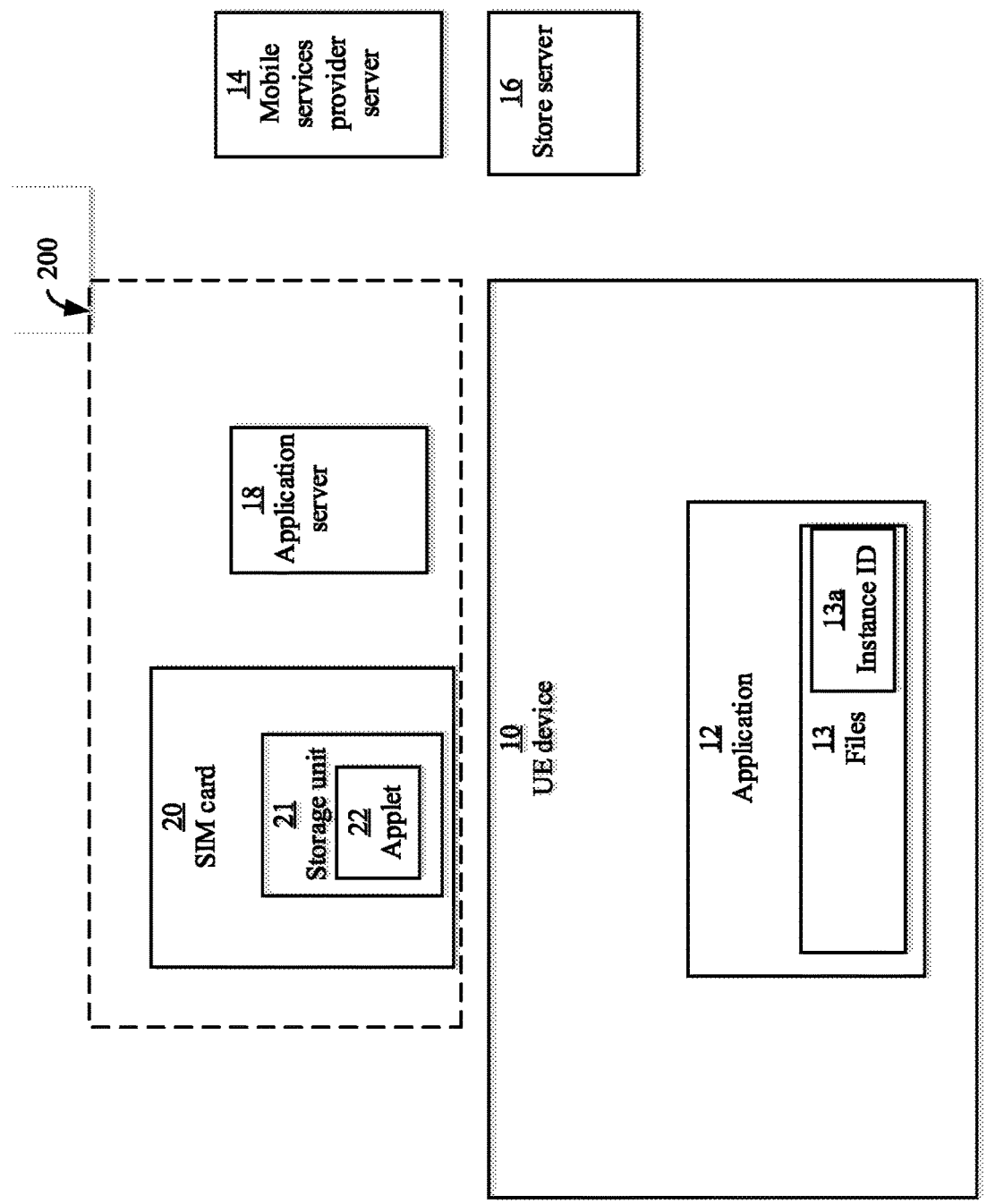
FIG. 2 is a schematic illustration of a system for securing a SIM card, according to some embodiments of the present invention.

For example, reference is now made to FIG. 2, which is a schematic illustration of a system 200 for controlling and securing a smart card, according to some embodiments of the present invention. System 200 includes an access application server 18 and smart cards 20. Smart cards 20 may be provided and/or controlled by a mobile service provider, a cellular network service provider or another entity, which be associated with a smart card control server 14. Smart card 20 may include a storage unit 21. Smart card 20 may store in storage unit 21 and/or execute an applet 22 for securing the SIM card, as will be described in more detail below, according to some embodiments of the present invention.

Access application server 18 may control and/or execute an access application instance 12 for unlocking access to smart card 20. Throughout the present description, access application instance 12 is also referred to as access application 12. Access application instance 12 may be downloaded by a User Equipment (UE) device 10, such as a cellular communication device, via an application store server 16 or directly from application server 18. UE device 10 may include, for example, any mobile communication and/or computer device using a smart card. In some embodiments of the present invention, the operation of UE device 10 is disabled or very limited as long as a smart card is not installed. Additionally or alternatively, the installed smart card is locked for use, for example certain networking services such as, for example, cellular services, are disabled and/or the smart card is programmed to intentionally limit the operation of device 10, for instance limit to execution of a specific application and/or disable networking services.

Once access application instance 12 is downloaded, UE device 10, for example controlled by smart card 20, may store and/or execute application files 13 such as, for example, application-specific Software Development Kit (SDK) files and/or other suitable application files. Application files 13 may include application instance identification (ID) 13a that identifies exclusively the application instance 12 installed on device 10 such as, for example, a GCM registration ID, instance ID API, or any other suitable instance ID.

According to some embodiments of the present invention, a user of UE device 10 may receive a smart card 20 from a mobile services provider or another entity. Initially, smart card 20 may be locked, i.e. disable utilization of various functionalities of UE device 10 and or enable no or very limited usage of device 10. In order to enable full or more extensive utilization of device 10, the access application needs to be downloaded into device 10. Once smart card 20 is inserted into UE device 10, UE device 10 may initiate download of access application 12, for example by presenting a message to the user about a requirement to download access application 12, by presenting a download page or a link to a downloading page, by connecting with application store server 16 and/or application server 18, and/or by any other suitable manner.

Accordingly, smart card 20, executing applet 22, may control UE device 10 to download to device 10 and install access application 12 via application store server 16 or directly from application server 18, for example by the user's instructions or automatically. Once access application 12 is downloaded, access application 12 may be paired with applet 22, as will be described in detail herein, according with some embodiments of the present invention. For example, applet 22 may obtain or generate the validation key or key pair, for example, in conjunction with application server 18 or by sharing the validation key with application server 18, as described in more detail herein below. Then, applet 22 may validate the instant of application 12 installed on device 10, for example, at least partially via application server 18. Once application 12 is validated, applet 22 and application 12 may be paired. Pursuant to the pairing, applet 22 and/or application server 18 may send a request to smart card control server 14 to unlock smart card 20, for example, in order to enable extended utilization of UE device 10.

Figure 3:
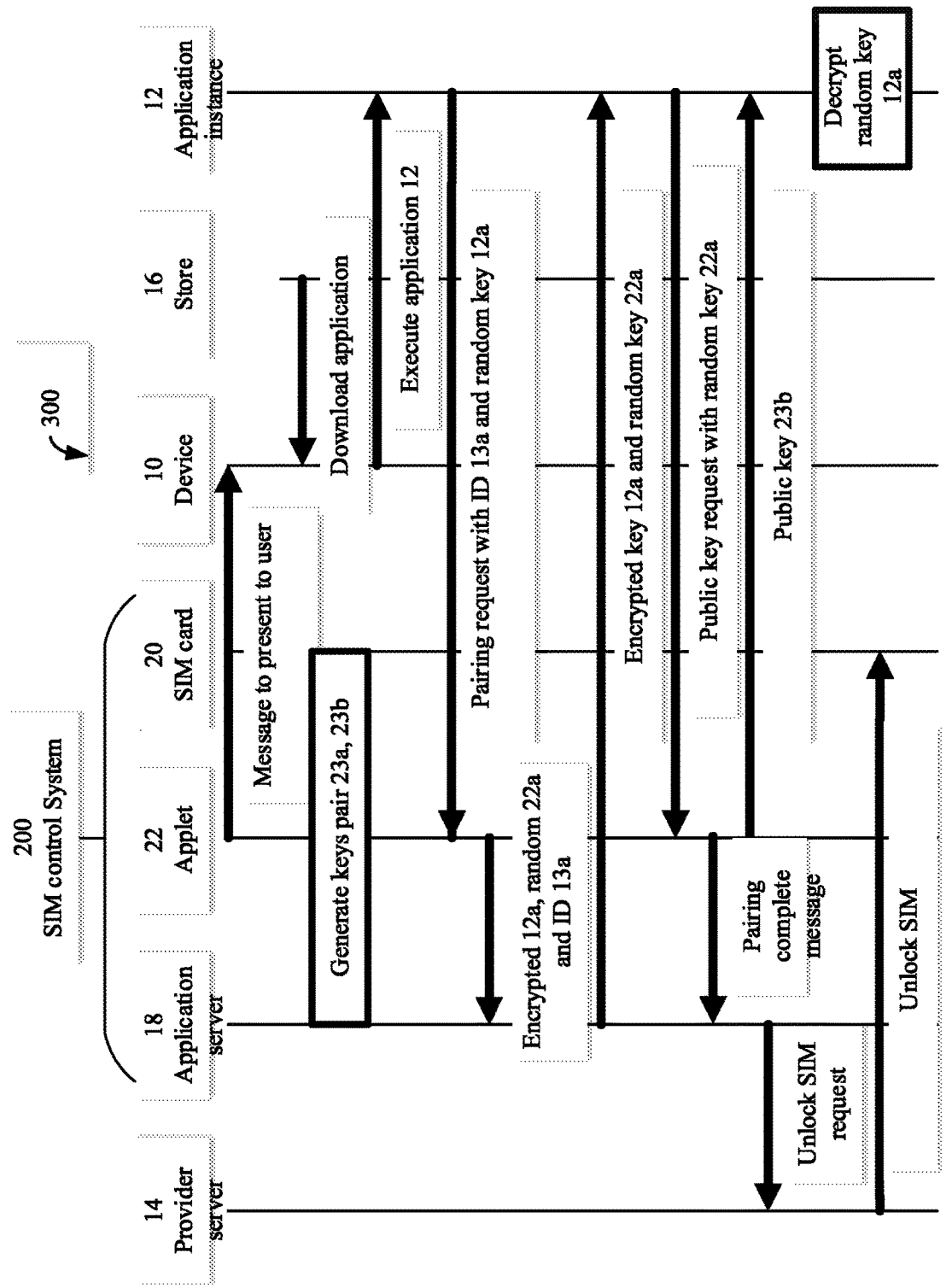
FIG. 3 is a schematic illustration of an exemplary communication sequence, according to some embodiments of the present invention.

Further reference is now made to FIG. 3, which is a schematic illustration of an exemplary communication sequence 300, according to some embodiments of the present invention. For example, applet 22 may send a message to present to the user, for example on a display of UE device 10, about the requirement to download access application 12. Then, applet 22 may direct the user to a download page provided by application store server 16 and/or application server 18, for example, once the message is approved by the user, or the user may reach the download page manually. In some other embodiments of the present invention, applet 22 may direct the user directly to a download page provided by application store server 16 and/or application server 18, without presentation of a message. Once reaching the download page, device 10 may download application 12, for example upon receiving a download command from the user.

In further embodiments of the present invention, applet 22 may automatically download access application 12 via application store server 16 and/or application server 18, for example once smart card 20 is installed in device 10.

Then, access application 12 may be stored and executed in device 10, for example, application files 13 may be stored to device 10 and may be executed. At this stage, application 12 may be locked, for example may require a validation process in order to enable usage of device 10. Application 12 and applet 22 may go through a pairing procedure, as described in more detail herein below. Once the pairing is validated, the instance of application 12 on device 10 may be validated, and smart card 20 may be unlocked. In some embodiments of the present invention, in order to operate device 10, smart card 20 and/or access application 12 need to be unlocked.

As long as access application 12 is locked, for example before it undergoes the validation process, it may be launched on device 10. However, no other usage or very limited usage may be made with device 10. For example, certain networking services such as, for example, cellular services, may be disabled. Once unlocked, regular and/or more extensive usage may be made with device 10. In some embodiments of the present invention, application 12 may require renewed validation, for example every pre-determined period of time or upon service provider requirement and/or when another determined condition is fulfilled. In such cases, usage of smart card 20 may re-lock and/or application 12 may re-lock, for example every pre-determined period of time, when device 10 exits a certain geographical area, when device 10 leaves a coverage area of a network, when a configuration of device 10 changes, and/or any other determined condition. In some embodiments, applet 22 may display a notification when application 12 needs re-validation or when one of the determined conditions is about to be fulfilled. Then, in order to utilize device 10 and/or unlock smart card 20, application 12 needs to undergo the validation process again.

As indicated in block 110, applet 22 may provide, for example obtain and/or generate, a validation key for validating an application downloaded to the User Equipment (UE) device. The validation key may be shared with application server 12.

In some embodiments of the present invention, smart card 20 may communicate with application server 18 to generate an encryption key pair such as, for example, Advanced Encryption Standard (AES) key pair, Triple Data Encryption Algorithm (TDES) key pair, a Rivest-Shamir-Adleman (RSA) key pair or any other suitable public key encryption system. The key pair, for example a private key 23a and a public key 23b, may be generated and/or stored, for example, by smart card 20 and/or provided to applet 22. Application server 18 may receive public key 23b from smart card 20. The communication between applet 22 and application server 18 may be performed over a secured channel such as a secured internet protocol channel, a secured Bearer Independent Protocol (BIP) channel, Short Message Service (SMS) message and/or any other suitable secured channel.

In some embodiments of the present invention, public key 23b may be shared with application server 18. Application server 18 may receive public key 23b, for example, automatically, by subscribing to a certain smart card provider server. In some other embodiments, smart card 20 may include key pair 23a and 23b stored therein, and may share public key 23b with application server 18. In some other embodiments, application server 18 may receive public key 23b by extracting the key from a shared database of public keys associated with respective smart cards.

In some embodiments of the present invention, application server 18 may extract public key 23b from smart card 20, for example from a file system of smart card 20. Application server 18 may use software tools such as, for example, an Application Programming Interface (API) kit, in order to access the SIM card's file system. For example, such as SmartCard API and/or other software tools, for example, provided by Secure Element Evaluation Kit (SEEK) open source project.

Once receiving the key pair, as indicated in block 120, applet 22 may validate application 12. For example, by using the key pair 23a and 23b, application 12 and applet 22 may go through a pairing procedure that may unlock smart card 20.

Accordingly, solutions provided by some embodiments of the present invention require both applet 22 and access application 12 in order to utilize device 10.

For example, upon execution of files 13, access application 12 may generate an application random key 12a and extract instance ID 13a from files 13. Then, access application 12 and applet 22 may carry out a validation procedure by using private key 23a and public key 23b as follows. Access application 12 may send a pairing request to applet 22, including random key 12a and instance ID 13a. Applet 22 may encrypt random key 12a by private key 23a and generate an applet random key 22a and forward the encrypted random key 12a together with random key 22a to application server 18, along with instance ID 13a. Based on the instance ID 13a, application server 18 may forward the encrypted random key 12a and random key 22a to the instance of application 12 on device 10. Random key 22a may be used by application 12 for getting public key 23b, by which the encrypted random key 12a may be decrypted and recognized by application 12. Once recognized, application 12 may be unlocked.

In order to get public key 23b, application 12 may return random key 22a to applet 22, together with a request for the public key. For example a request for the public key sent to applet 22 may include random key 22a generated by applet 22. Applet 22 may recognize random key 22a and therefore reply application 12 with public key 23b. Application 12 may then use public key 23b to decrypt the encrypted random key 12a. Once the encrypted random key 12a is decrypted, application 12 may recognize key 12a and be unlocked.

As indicated in block 130, application server 18 may receive a message from applet 22 about completion of a validation process. For example, once recognizing random key 22a received from application 12 and/or after application 12 is unlocked, applet 22 or application 12 may notify application server 18 that the pairing of application 12 and applet 22 is completed.

Then, as indicated in block 140, application server 18 may send a request to control server 14 to unlock smart card 20 and in response, control server 14 may unlock smart card 20. In some other embodiments, applet 22 may communicate directly with control server 14 and send a request directly to control 14 to unlock smart card 20, for example once recognizing random key 22a received from application 12 and/or after application 12 is unlocked.

Figure 4:
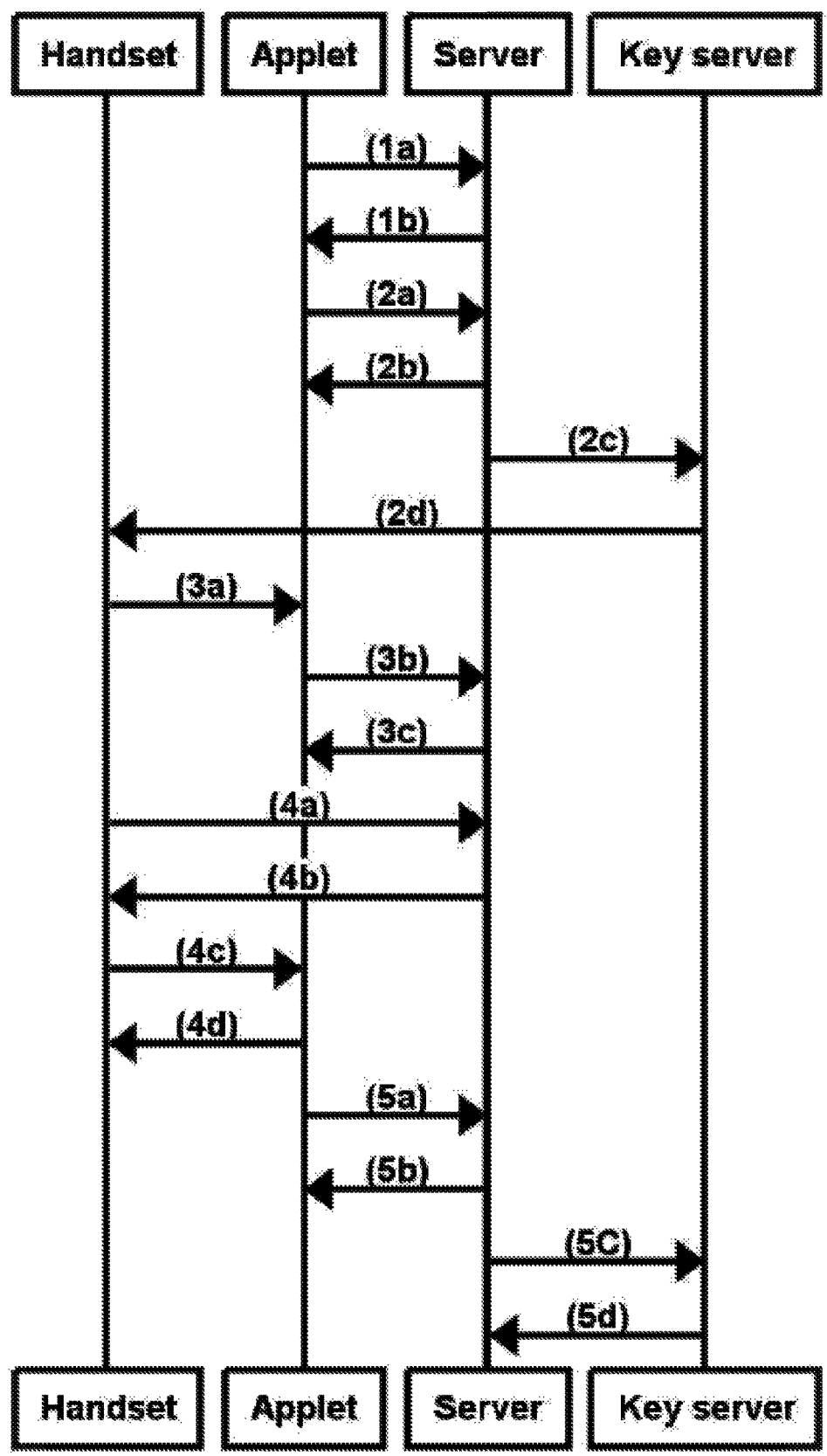
FIG. 4 is another schematic illustration of an exemplary communication sequence which is based on RSA Key exchange, according to some embodiments of the present invention.

Reference is also made to FIG. 4, which is another schematic illustration of an exemplary communication sequence based on RSA Key exchange, according to some embodiments of the present invention. In this process, five distinct stages are described and marked with reference numerals 1-5. First, as shown at 1a and 1b, RSA Key is generated. On reset of an SIM Applet, it is verified if the RSA Key has been exchanged between the Applet and the server and if so the process continues to the following stage. If the RSA Key has not been exchanged key the SIM generates a key pair of possible and an integrated circuit card identifier (ICCID) of the SIM is read and sent to the server with the public key. If the SIM cannot generate a key pair, the SIM requests that the server generates the key pair and returns a private key (encrypted using a session key). At the second stage, Universal Integrated Circuit Card (UICC) Registration is performed. During this stage, as shown at 2a and 2b, information on the UICC is gathered and registered with the server. The following items are included in a request sent in 2a:

a request to retrieve the Mobile Subscriber Integrated Services Digital Network (ISDN) Number (MSISDN) and International mobile subscriber identity (IMSI) of the SIM.

b. request to retrieve the International Mobile Equipment Identity (IMEI), IMEI Software Version (IMEISV) and Electronic Serial Number (ESN) of UE device 10, also referred to as a respective handset.

c. instructions to provide a random challenge to the server.

Now, as shown at 2c and 2d, an SMS is sent upon successful registration of the UE device prompting a download of the associated application.

Now handset registration is held. During the launch, the application is registered by the SIM Applet that passes, as shown at 3a, a random challenge and a timestamp. As shown at 3b and 3c the SIM Applet sends the handset details to the server in message.

Following the registration, unlock request is handled. As shown at 4a and 4b upon successful handset registration the application requests a login token from the server. The token (4b) is encrypted with the SIM Applet public key. This is passed to the applet for validation as shown at 4c and 4d. This allows an issuer to enforce a policy of periodic token renewal when required.

The process ends by unlocking the SIM. As shown at 5a and 5b. when the token has been validated by the SIM Applet a request is sent to the server to unlock the SIM. The server invoke the relevant mobile network operator (MNO) trusted service manager (TSM) API methods to grant full access to the network capabilities.

The methods as described above are used in the fabrication of integrated circuit chips.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. An integrated circuit designed to be inserted into a port of a cellular communication device comprising:
   a storage unit for storing an applet, wherein said applet comprises instructions for:
   downloading to the UE device an application from an application server;
   obtaining a validation key shared with the application server;
   validating the application using the validation key; and
   sending to a cellular network service provider a request to unlock a locked use of the integrated circuit;
   wherein the applet comprises instructions for receiving from the application a validation request together with a first random key and an application instance identification.

2. The integrated circuit according to claim 1, wherein the applet further comprises instructions for:
   encrypting the first random key by a private encryption key, the private key is from a pair of private and public encryption keys;
   generating a second random key;
   sending the encrypted first random key, the second random key and the application instance identification to the application server;
   receiving the second random key from the application; and
   replying to the application with the public encryption key, wherein the public encryption key enables the application to decrypt the encrypted first random key, identify the first random key and unlock the application based on the identification.

3. An integrated circuit designed to be inserted into a port of a cellular communication device comprising:
   a storage unit for storing an applet, wherein said applet comprises instructions for:
   downloading to the UE device an application from an application server;
   obtaining a validation key shared with the application server;
   validating the application using the validation key; and
   sending to a cellular network service provider a request to unlock a locked use of the integrated circuit;
   wherein unlocking of the use requires the validation of the application.

4. The integrated circuit according to claim 3, wherein the applet further comprises instructions for presenting a message to a user about a requirement to download the application.

5. The integrated circuit according to claim 3, wherein the applet further comprises instructions for obtaining a pair of private and public encryption keys.

6. The integrated circuit according to claim 3, wherein the locked use of the integrated circuit includes disabled networking services, wherein unlocking of the use enables the networking services.

7. The integrated circuit according to claim 3, wherein the use may be re-locked when a determined condition is fulfilled.

8. The integrated circuit according to claim 7, wherein the condition includes at least one of a list comprising a predetermined period of time, exiting of a certain geographical area, leaving of a coverage area of a network and change in a configuration of the device.

9. The integrated circuit according to claim 7, wherein the applet further comprises instructions for displaying a notification when the use is re-locked.

10. The integrated circuit according to claim 7, wherein the applet further comprises instructions for displaying a notification when the condition is about to be fulfilled.

11. The integrated circuit according to claim 7, wherein the applet further comprises instructions for re-validating the application in order to unlock the use of the integrated circuit.

* * * * *